United States Patent
Aiken et al.

(10) Patent No.: US 7,562,226 B2
(45) Date of Patent: Jul. 14, 2009

(54) SYSTEM AND METHOD FOR PERMISSION-BASED ACCESS USING A SHARED ACCOUNT

(75) Inventors: David Aiken, N. Lauderdale, FL (US); Timothy R. Gaylor, Plantation, FL (US); Thomas B. Dills, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 821 days.

(21) Appl. No.: 11/035,834

(22) Filed: Jan. 14, 2005

(65) Prior Publication Data

US 2006/0161783 A1 Jul. 20, 2006

(51) Int. Cl.
G06F 7/04 (2006.01)
(52) U.S. Cl. .................................... 713/182
(58) Field of Classification Search .............. 713/182, 713/186; 726/2, 9, 20, 3
See application file for complete search history.

(56) References Cited

U.S. PATENT DOCUMENTS

| | | | |
|---|---|---|---|
| 6,308,273 B1 | 10/2001 | Goertzel et al. | |
| 6,502,135 B1 | 12/2002 | Munger et al. | |
| 6,523,027 B1 | 2/2003 | Underwood | |
| 6,601,233 B1 | 7/2003 | Underwood | |
| 6,609,128 B1 | 8/2003 | Underwood | |
| 6,618,761 B2 | 9/2003 | Munger et al. | |
| 6,633,878 B1 | 10/2003 | Underwood | |
| 6,704,873 B1 | 3/2004 | Underwood | |
| 6,718,535 B1 | 4/2004 | Underwood | |
| 6,826,616 B2 | 11/2004 | Larson et al. | |
| 6,834,310 B2 | 12/2004 | Munger et al. | |
| 6,839,759 B2 | 1/2005 | Larson et al. | |
| 6,845,383 B1 | 1/2005 | Kraenzel et al. | |
| 6,871,346 B1 | 3/2005 | Kumbalimutt et al. | |
| 6,907,473 B2 | 6/2005 | Schmidt et al. | |
| 7,100,195 B1 | 8/2006 | Underwood | |
| 7,188,180 B2 | 3/2007 | Larson et al. | |
| 7,188,181 B1 * | 3/2007 | Squier et al. | ................ 709/228 |
| 7,210,167 B2 * | 4/2007 | Brezak et al. | .................. 726/18 |
| 7,296,077 B2 * | 11/2007 | Harmon et al. | ............. 709/229 |
| 2003/0046586 A1 | 3/2003 | Bheemarasetti et al. | |
| 2003/0046587 A1 | 3/2003 | Bheemarasetti et al. | |
| 2005/0149726 A1 | 7/2005 | Joshi et al. | |
| 2005/0262357 A1 | 11/2005 | Araujo et al. | |

* cited by examiner

Primary Examiner—Ellen Tran
(74) Attorney, Agent, or Firm—Choate Hall & Stewart, LLP

(57) ABSTRACT

A mechanism for rapidly authenticating an interactive user in an operating system logon session based on a shared account by using a credential delivery application to enable permission-based access to a user's remote session from the shared account is disclosed. The present invention provides the ability to switch local interactive users, authenticate the new interactive user, and switch the remote session without requiring the client to first establish a new logon session tied to the new local interactive user. The present invention also alters the normal locking mechanism found in operating system logon sessions so as to restrict access to an interactive local user's applications (both local and remote) while still allowing the rapid switching of interactive users at the client device.

31 Claims, 6 Drawing Sheets

SYSTEM AND METHOD FOR PERMISSION-BASED ACCESS USING A SHARED ACCOUNT

FIELD OF THE INVENTION

The illustrative embodiment of the present invention relates generally to the use of a shared operating system logon session, and more particularly to the rapid switching and authentication of credentialed interactive users within a shared account without re-starting the logon session.

BACKGROUND

An operating system logon session, such as a WINDOWS (from Microsoft Corporation of Redmond, Wash.) logon session, is conventionally generated for each successful authentication on a computer. An initiating process, such as the Winlogon.exe process in a WINDOWS environment, loads a GINA (Graphical Identification aNd Authentication) which presents a logon dialog box to an interactive user. The GINA may be default operating system GINA (which in WINDOWS is the MSGINA.dll) or a third party GINA operating in lieu of, or in addition to, the operating system GINA. Multiple GINAs may be employed in a chain. The logon dialog box requests user information such as a username, password and optionally target domain. In stand-alone operating environments, the interactive user is authenticated and then proceeds to operate according to the access rights and privileges set forth in the user profile identified during authentication. In network environments, the date of a network roaming profile for a local interactive user may be compared against the date of a local profile with any newer files in the roaming profile used to update the files already present on the system. In a network environment where the local interactive user is logged onto a client and wishes to access a server-hosted session, conventional methods of accessing the remotely hosted session assume that the interactive user accessing the remote session and the local user in the client operating system logon session are one and the same. Communications from the remote session are directed to the operating system logon session. When the local interactive user logs off from the remote session and leaves the client, the operating system logon session ends and a new logon session is started for the next local user.

FIG. 1 depicts the conventional process by which multiple interactive users logon to a client in order to access remote sessions. The sequence begins when the interactive user logs on to the operating system domain, such as a WINDOWS domain, at the client (step 2). An operating system logon session, such as a WINDOWS logon session is generated and associated with the interactive user (step 4). A network-stored roaming profile is then acquired for the interactive user based on the information used to logon to the operating system domain (step 6). The network-stored profile is retrieved and the client may be checked for the presence of a local profile. If a local profile exists on the client, the profiles are compared with newer files in the roaming profile being used to update the profile of the interactive user. The interactive user then submits an authentication password to access a server-hosted domain or an application on the server-hosted domain (step 8). The interactive user is required to submit authentication for each application or domain he is attempting to access (step 9). This may require multiple authentications. After the interactive user has completed the remote session and logs off from the remote session, the operating system logon session must also be logged off (step 10) before a subsequent interactive user is able to access the client (step 12). The subsequent interactive user is required to begin a new operating system logon process (step 2) before accessing a remote session.

Conventionally, the switching of interactive users on a client or kiosk in communication with the server necessitates the ending of both the remote session and the operating system logon session and the subsequent generation of a new operating system logon session and new connection to a remote session for a new local interactive user. Unfortunately, the requirement of a new operating system logon session for each new local interactive user results in sub-optimal wait times for users in time-sensitive locations such as hospitals. For example, if a first doctor accesses a computer in a hospital and then responds to a patient, a second doctor using the computer is not going to want to wait for authentication processes required with an entirely new operating system logon session. Additionally, conventional shared workstations are subject to unauthorized use and make it difficult to provide accountability for the actions taken by users at the workstations.

BRIEF SUMMARY

The illustrative embodiment of the present invention provides a mechanism for rapidly authenticating an interactive user in an operating system logon session based on a shared account by using a credential delivery application to enable permission-based access to a user's remote session from the shared account. The present invention provides the ability to switch local interactive users, authenticate the new interactive user, and switch the remote session without requiring the client to first establish a new logon session tied to the new local interactive user. The present invention also alters the normal locking mechanism found in operating system logon sessions so as to restrict access to an interactive local user's applications (both local and remote) while still allowing the rapid switching of interactive users at the client device.

In one embodiment, a system includes a storage location holding multiple sets of interactive user credentials. Each set of credentials are associated with a different interactive user and indicate a permission level for one or more applications and/or an access level for a server-hosted domain. The system also includes a server in connection with a client. The server hosts a session for a first local interactive user of the client, the client executing an active operating system logon session for a shared account. The active operating system logon session is established with a default user profile that is not associated with a particular interactive user. The system additionally includes a credential delivery application that communicates with the server and the client. The credential delivery application receives an identifier identifying the first local interactive user via the client and uses the identifier to retrieve a first set of credentials for the first local interactive user from the storage location. The first set of credentials are delivered by the credential delivery application to the server and used to map the first local interactive user to a server-hosted session for the first local user.

In another embodiment in an electronic device, a method of providing permission-based access to an active operating system logon session includes the step of hosting on the electronic device an active operating system logon session for a shared account. The shared account is established with a default user profile not associated with a particular interactive user. The electronic device is in communication with a server. The method also includes the step of receiving a first identifier identifying a first local interactive user via the electronic device. The method additionally includes the step of using the first identifier to retrieve a first set of credentials for the first local interactive user, the first set of credentials being stored in a location accessible to the electronic device and the server and indicating at least one permission level for either at least one application or an access level for a server-hosted session associated with the first local interactive user. The method also maps the server-hosted session for the first local interactive user into the active operating system logon session on the electronic device using the first set of credentials.

In an embodiment in an electronic device, a method of providing permission-based access to an existing operating system logon session includes the step of hosting on the electronic device an active operating system logon session for a shared account, the shared account originally established with a default user profile not associated with a particular interactive user. The method further includes the step of receiving a first identifier identifying a first local interactive user and the step of using the first identifier to retrieve a first set of credentials for the first local interactive user. The first set of credentials indicates at least one permission level for either at least one application or an access level for a session associated with the first local interactive user on the electronic device. The method also maps the session associated with the first local interactive user into the active operating system logon session using the first set of credentials.

DETAILED DESCRIPTION

The illustrative embodiment of the present invention provides the ability to switch rapidly between multiple authenticated interactive users in a time-sensitive environment. The term "interactive user" is used to distinguish human users from an automated process. By establishing a operating system logon session for a shared account based on a default user profile and separating the authentication of the identity of local interactive users from that logon session, the present invention allows the local interactive users to rapidly access remote sessions in a secure manner on the shared client system. The present invention also enables an alteration of the locking mechanism engaged in by typical operating system logon session so as to increase the availability of a system to a subsequent interactive user for services while maintaining the security and privacy of the original interactive user's applications. The alteration of the locking mechanism also helps prevent unauthorized use while improving accountability for actions taken at the client system.

Figure 1:
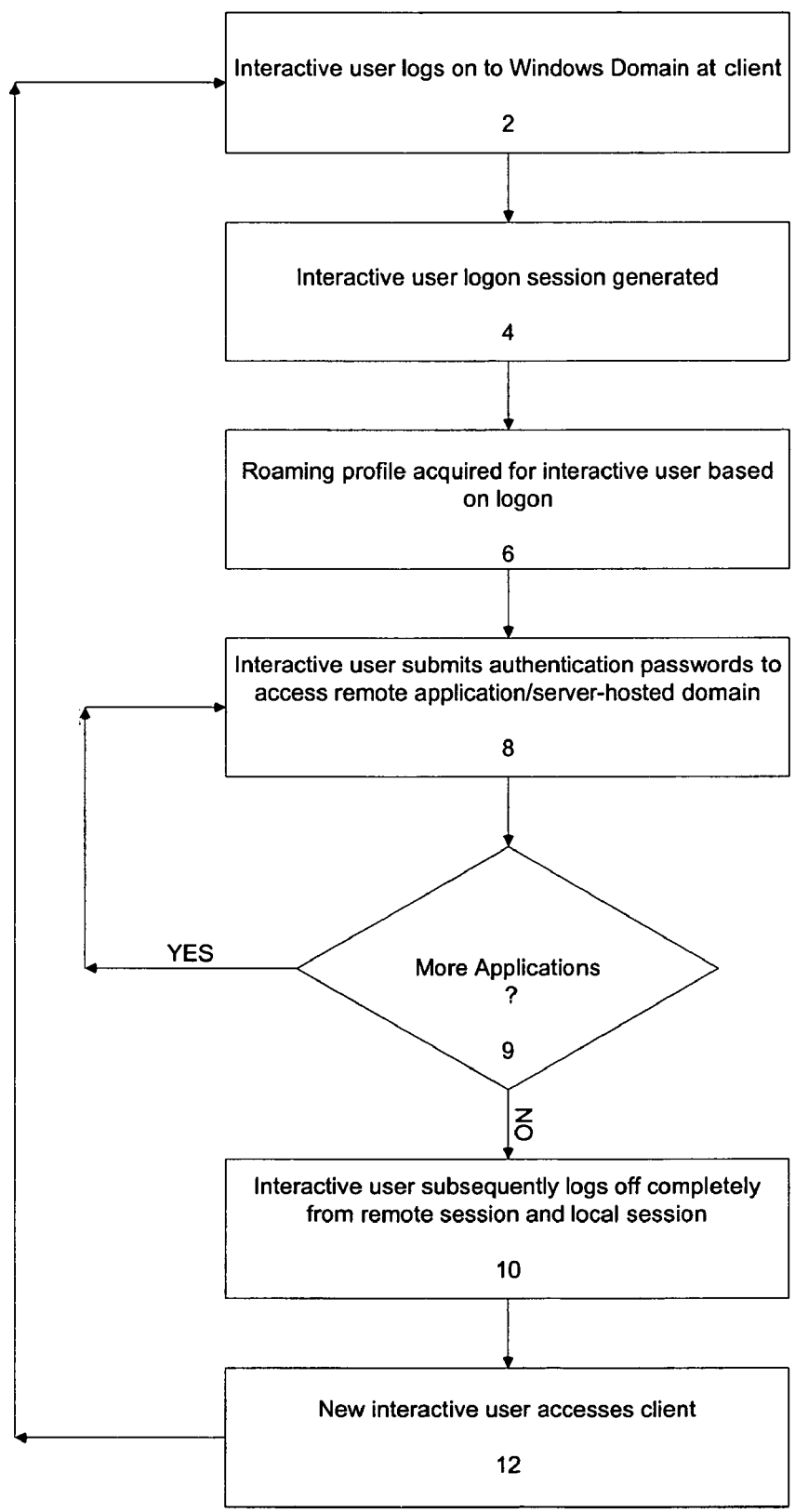
FIG. 1 (Prior Art) is a flowchart of the conventional sequence of steps by which a local interactive user logs into an operating system domain and accesses a remote session.
Figure 2:
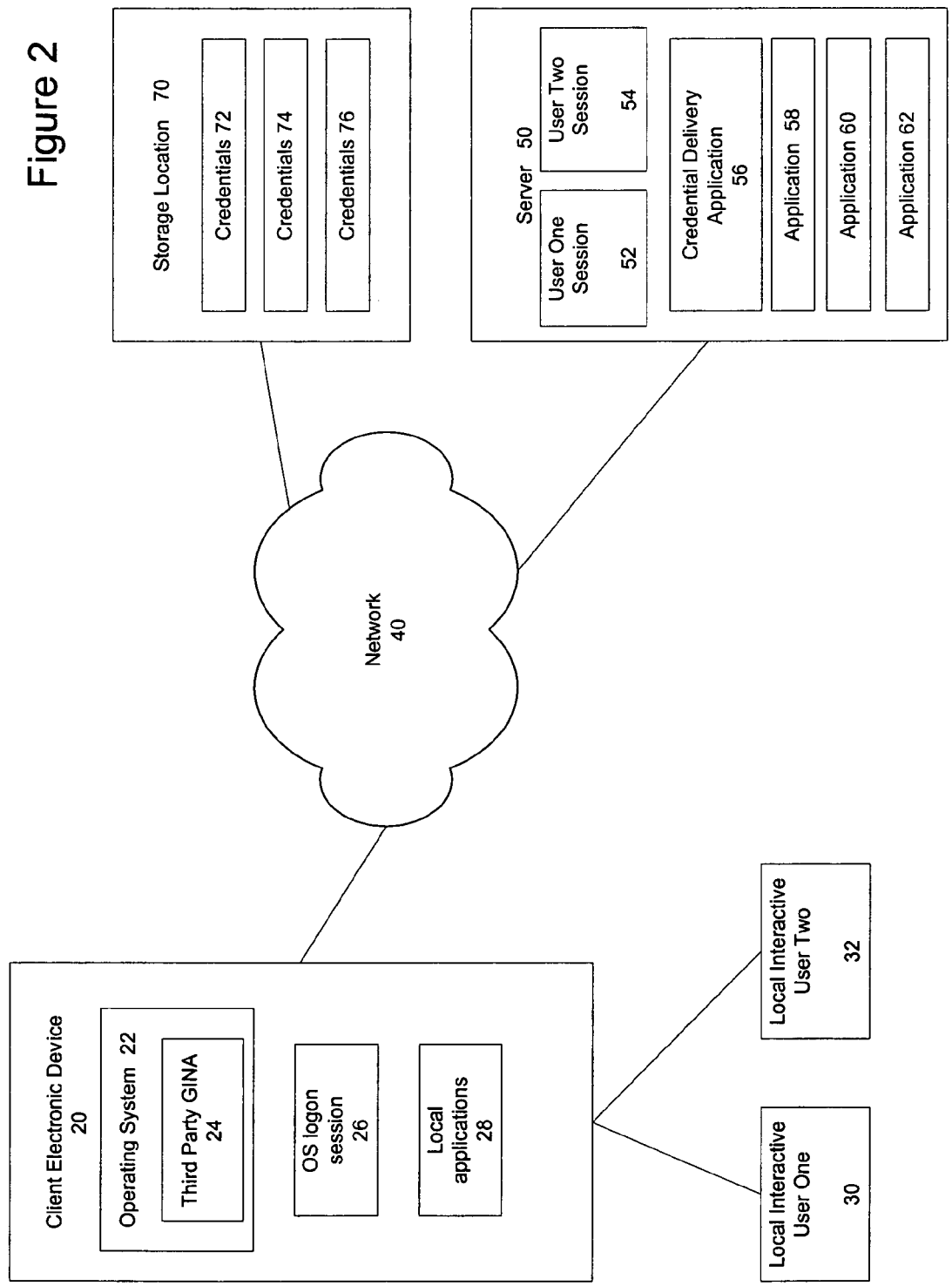
FIG. 2 is a block diagram of an environment suitable for practicing the illustrative embodiment of the present invention.

FIG. 2 depicts an environment suitable for practicing the illustrative embodiment of the present invention. A client electronic device 20 communicates over a network 40 with a server 50. The client electronic device 20 may be a desktop, workstation, laptop, PDA, WINDOWS kiosk, or other electronic device equipped with an operating system and capable of supporting remote access to the server 50. The client electronic device 20 includes an operating system 20 and a third party GINA 24. The operation of the third party GINA 24 will be discussed further below. The client electronic device 20 automatically generates a shared operating system logon session 26 based upon a default user profile with a pre-determined set of permissions and privileges. The default user profile is provided by a third party and is not a default profile provided by the operating system. The client electronic device 20 may also include local applications 28 which may be utilized by interactive user one 30 and interactive user two 32 in the manner set forth herein.

As noted above, the client electronic device 20 communicates over a network 40 with a server 50. The network may be a local area network (LAN), a wide area network (WAN), an intranet, the Internet or some other type of network. The server 50 provides remote access to applications 58, 60 and 62 depending upon the access rights of the interactive user. In one implementation, the server 50 is a MetaFrame Presentation Server from Citrix Systems, Inc. of Fort Lauderdale, Fla. providing remote access to enterprise applications using a presentation level protocol. The server 50 includes a credential delivery application 56 which accepts an identifier holding local user information such as username, password and domain from the $3^{rd}$ party GINA 24. The credential delivery application 56 uses the local interactive user information to retrieve a set of credentials 72, 74 or 76 associated with the local interactive user from a network-accessible storage location 70. Each set of credentials 72, 74 and 76 are associated with a different interactive user. In one implementation, the credential delivery application may be MetaFrame Password Manager from Citrix Systems, Inc.

Those skilled in the art will recognize that the components depicted in FIG. 2 are meant to illustrate one possible architecture and that many other architectures are possible within the scope of the present invention. For example, the storage location 70 may be located on the server 50. Similarly, the applications 58, 60 and 62 to which the server 50 provides access may be located remotely from the server at a separate network-accessible location. The figures depicted herein should be understood to be exemplary and should not be viewed in a limiting sense. It should also be understood that although references are made to the WINDOWS operating system from Microsoft Corporation, the present invention may also be implemented using other operating systems.

The operating system 22 is configured to start an initial process which loads the third party GINA 24 which will present a logon dialog box to an interactive user. The initial process also is informed by the third GINA 24 (through the triggering of event or similar process) to automatically logon a default user with a base profile thereby creating a shared account with a minimal set of privileges. The third party GINA 24 then receives logon information from a local interactive user and transmits the information to the credential delivery application 56. The credential delivery application 56 receives the local interactive user information and automatically retrieves from a network accessible storage location a set of credentials associated with the local interactive user. The credentials for the local interactive user are used to automatically set the authorizations for the local interactive user within a server-hosted session 52 or 54 which the interactive user is allowed to access from the client electronic device 20. For example, the set of credentials may allow the local interactive user administrator privileges when accessing the server. Alternatively, the local interactive user may have read privileges within some applications and read-write privileges within other applications.

The third party GINA of the present invention alters the traditional locking mechanism that occurs when a interactive user locks a workstation either directly through the shell or indirectly from within an application. Traditionally, the initiating process (in a WINDOWS domain winlogon.exe) checks to see whether the first GINA and any others GINAs supplementing the first GINA allow the request to lock. In contrast, the third party GINA of the present invention is loaded first in the chain of GINAs and inserts a request to lock the interactive user into the chain of GINAs. If the next or subsequent GINA declines, the process is aborted. If the next and subsequent GINAs allows the lock request, then the workstation is locked and an authentication dialog is displayed. Upon a subsequent successful authentication, the actions taken vary based upon the identity of the interactive user. If the same interactive user authenticates, the interactive user is logged back in to the remote session. If the authenticating interactive user is new, the remote session is terminated and a new session is started (or restored if the server has a saved session for that interactive user). The third party GINA of the present invention does not pass the lock request back to the operating system so that the shared account does not change. The result of the interception of the lock request is that a new logon session and retrieval of a profile for an interactive user is not required. Those skilled in the art will recognize that the locking may occur in response to a direct interactive user command, as a result of time parameter being exceeded, or the occurrence of some other event. In one implementation, a locked workstation that remains locked for longer than a pre-determined parameter automatically causes a remote session to be terminated and a new session started when the lock is released. It should be noted that logoff requests may be treated in a similar manner as lock requests.

Figure 3:
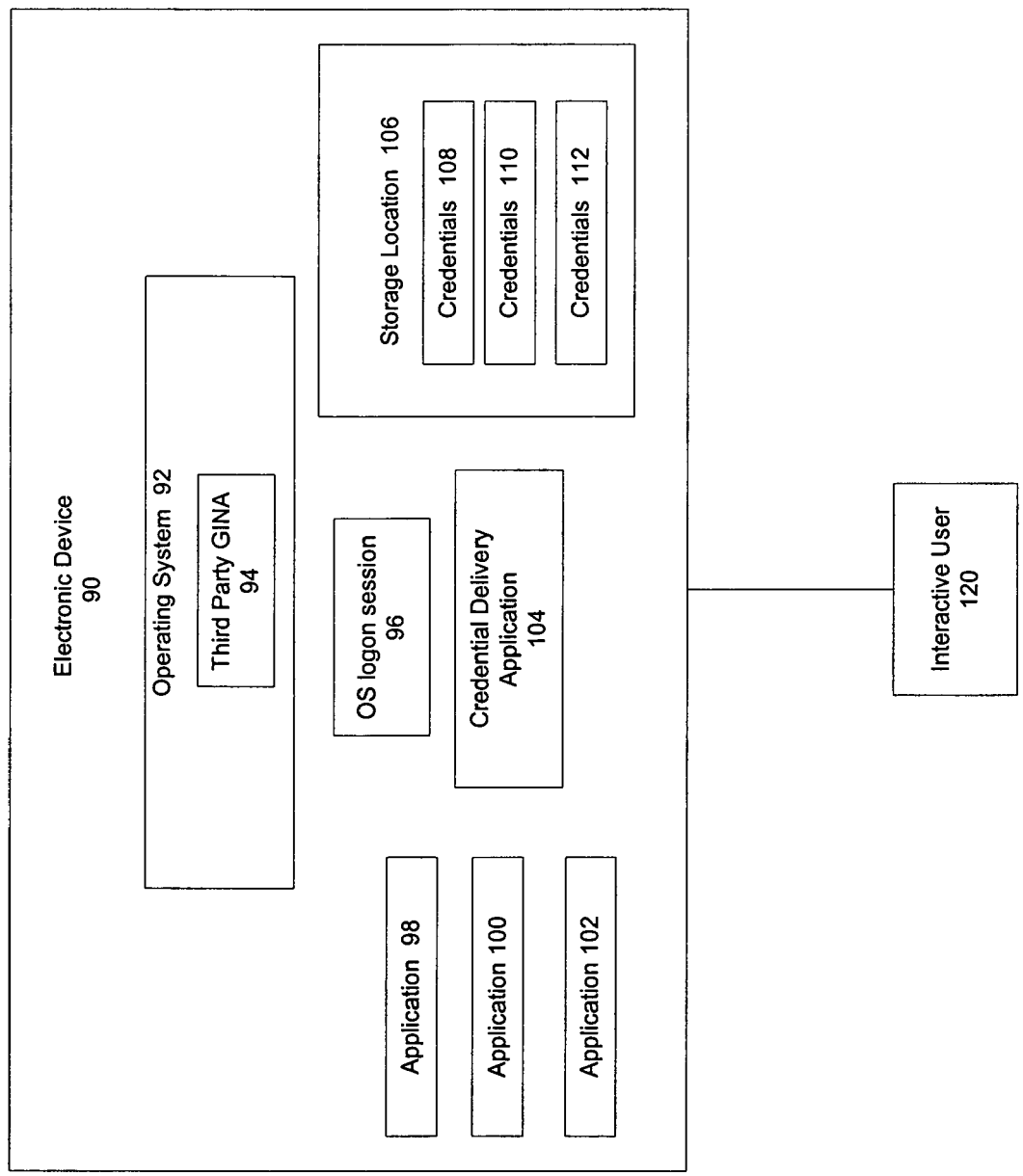
FIG. 3 is a block diagram of an alternative environment suitable for practicing the illustrative embodiment of the present invention.

Although particularly useful in network environments, the present invention may also be practiced in non-networked processor-equipped devices. FIG. 3 depicts an alternate implementation of a stand-alone electronic device 90 which employs the present invention to rapidly grant permission-based access to multiple interactive users in a secure manner. The electronic device 90 includes an operating system 92 and the third party GINA 94 of the present invention. Upon initialization, the electronic device 90 automatically creates an operating system logon session 96 using a default user profile with a pre-determined set of permissions and privileges. An interactive user 120 accessing the electronic device 90 logs on via the third party GINA 94 which relays the interactive user information to a credential delivery application 104. The credential delivery application 104 uses the input interactive user information to retrieve a set of interactive user credentials 108, 110 or 112 that are associated with the interactive user 120 from a storage location 106. The credentials are delivered to the server which then allows access by the interactive user 120 to applications 98, 100 and 102 consistent with the retrieved interactive user credentials.

Figure 4A:
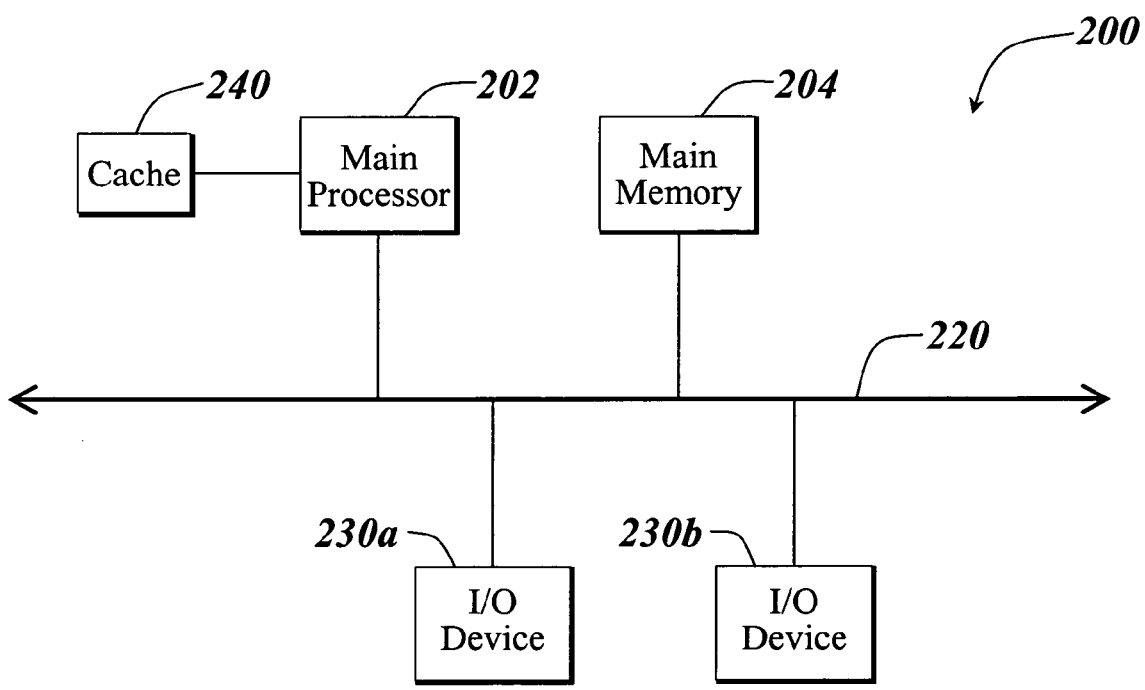
FIGS. 4A and 4B are block diagrams depicting embodiments of computers useful in connection with the present invention.
Figure 4B:
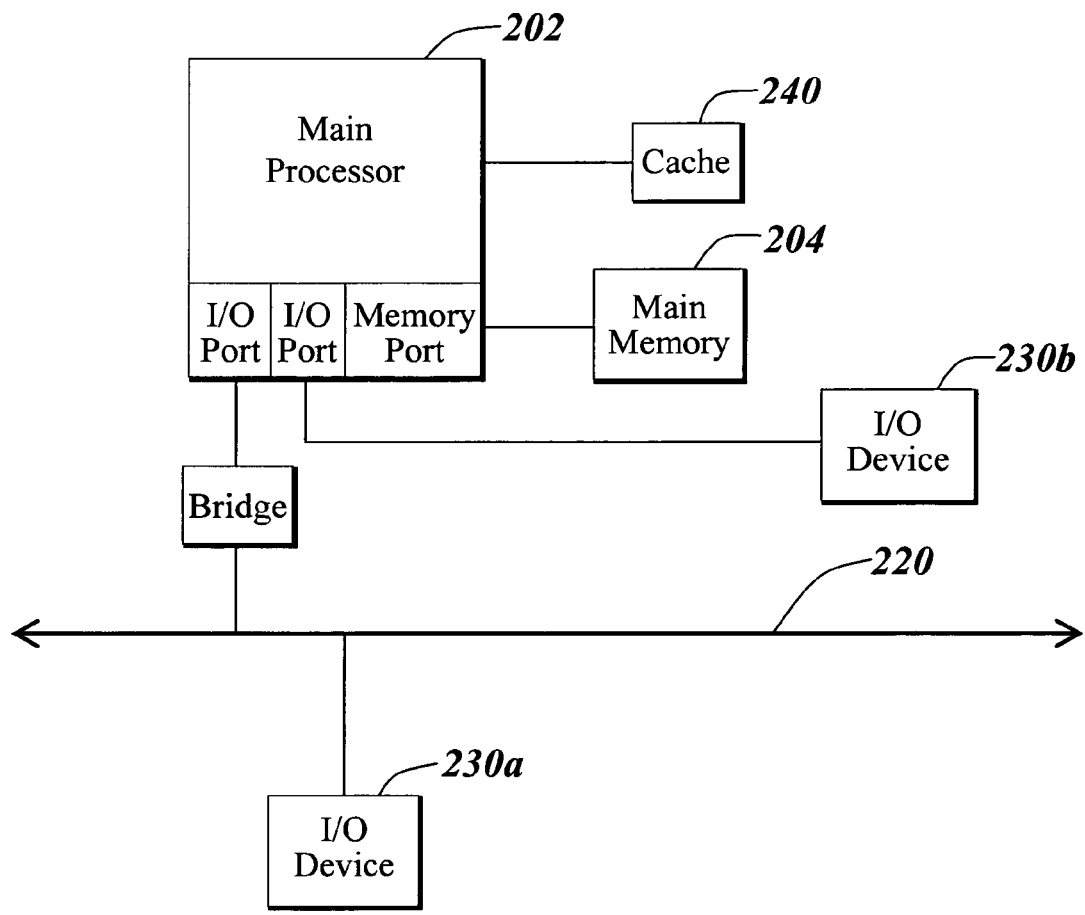

In many embodiments, the client electronic device 20 and the server 50 are provided as personal computer or computer servers, of the sort manufactured by the Hewlett-Packard Corporation of Palo Alto, Calif. or the Dell Corporation of Round Rock, Tex. FIGS. 4A and 4B depict block diagrams of a typical computer 200 useful as the server 50, or the client device 20 in those embodiments. As shown in FIGS. 4A and 4B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y. ; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 4A, the processor 202 communicates with main memory 204 via a system bus 220 (described in more detail below). FIG. 4B depicts an embodiment of a computer system 200 in which the processor communicates directly with main memory 204 via a memory port. For example, in FIG. 4B the main memory 204 may be DRDRAM.

FIGS. 4A and 4B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 4A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 4B depicts an embodiment of a computer system 200 in which the main processor 202 communicates directly with I/O device 230b via HyperTransport, Rapid I/O, or InfiniBand. FIG. 4B also depicts an embodiment in which local buses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

General-purpose desktop computers of the sort depicted in FIGS. 4A and 4B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the client device 20 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client device 20 is mobile, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client device 20 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, Calif., or the Toshiba PocketPC e405, manufactured by Toshiba America, Inc. of New York, N.Y. In still other embodiments the client device is a combination PDA/telephone device such as the Treo 180, Treo 270 or Treo 600, all of which are manufactured by palmOne, Inc. of Milpitas, Calif. In still further embodiment, the client device 20 is a cellular telephone that operates under control of the PocketPC operating system, such as the MPx200, manufactured by Motorola Corp.

Figure 5:
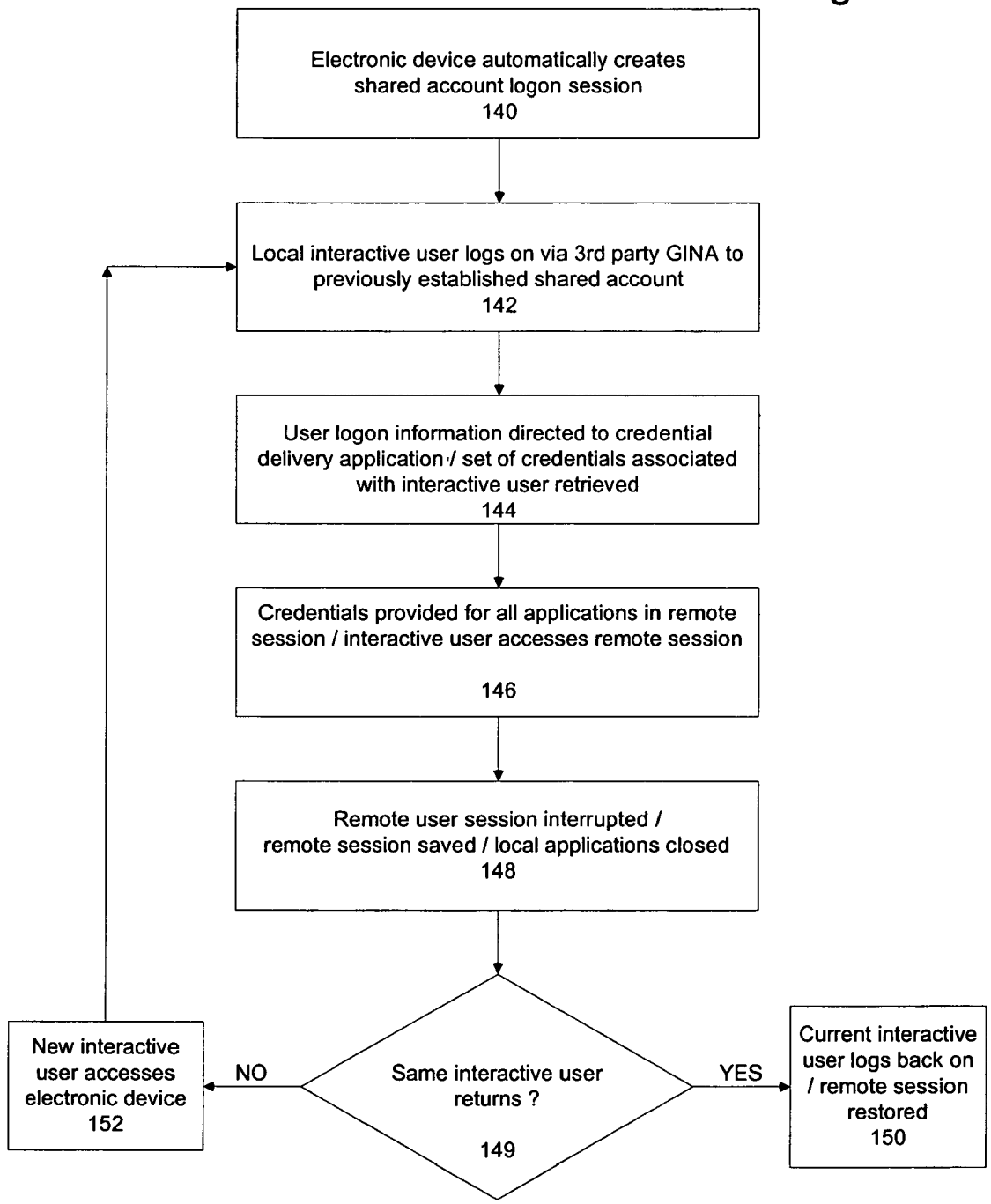
FIG. 5 is a flowchart of a sequence of steps followed by the illustrative embodiment of the present invention to switch local interactive users without generating a new operating system logon session.

FIG. 5 is a flowchart of the sequence of steps followed by the illustrative embodiment of the present invention to rapidly switch between authenticated interactive users without generating a new operating system logon session. The sequence begins when the electronic device automatically creates a shared account logon session using a default profile (step 140). Subsequently, the local interactive user logs on to the electronic device which is already executing the operating system logon session via a $3^{rd}$ party GINA (step 142). The logon information may be received by the electronic device in a number of different ways. The information may be received via an interactive user entering the information from a keyboard. Alternatively the interactive user may enter the information by inserting a smart card into a smart card reader, by having identity information on a proximity card that is read upon coming into range of a proximity sensor. The authentication may be based upon a retinal scan, fingerprints, a facial recognition process or other biometric information. Those skilled in the art will recognize that the authentication information may be received in many different ways by the electronic device without departing from the scope of the present invention.

In one aspect of the present invention, encryption may be added to process of retrieving the interactive user credentials. The set of credentials for the interactive user may be stored in encrypted form at the storage location. The identifiers for the interactive user may also be encrypted. The credential delivery application may pass an encrypted identifier to a smart card which then decrypts the identifier and returns them to the credential delivery application. The credential delivery application may then use the decrypted identifier in decrypting the encrypted set of credentials. Those skilled in the art will recognize that a USB token that includes a smart card or other device providing decryption functionality may also be used without departing from the scope of the present invention. Similarly, the smart card or other device may partially decrypt the identifier as part of a multiple stage decryption process with the remaining decryption/transformation of the interactive user credentials taking place at an additional location. Similar decryption techniques to process the encrypted interactive user credentials and identifiers should be considered within the scope of the present invention.

The interactive user logon information is directed to a credential delivery application which uses the information to retrieve a set of credentials associated with the local interactive user (step 144). The set of credentials provides the relevant permissions and privileges for a server-hosted domain and the applications running on the server which the interactive user is able to access remotely (step 146). Subsequently, the session of the interactive user is interrupted, either voluntarily or involuntarily. For example, in a hospital, a doctor using a WINDOWS kiosk may be called away to attend a patient. The doctor may affirmatively disconnect the session by making a selection, withdrawing a smart card or in some other manner such as a proximity card leaving a sensor range. Alternatively, the session may be disconnected by a time-out parameter being exceeded after the doctor walks away. Upon interruption of the remote session, the remote session is saved and any local applications launched for the doctor are closed (step 148). The operating system logon session is not disrupted and continues to run.

Upon a local interactive user returning to the electronic device, the interactive user is evaluated to determine if the interactive user is a previous interactive user returning or a new interactive user (step 149). If the previous interactive user is the next interactive user to log back onto the electronic device, the remote session is restored (step 150). If the interactive user accessing the electronic device is a new interactive user (step 152), the previous remote session for the first interactive user is unmapped from the operating system logon session following the new interactive user information being entered into the third party GINA. Instead a new session for the new interactive user is begun or restored on the server. Returning to the hospital example, if a second doctor followed the first doctor, the second doctor would be able to be quickly authenticated without the requirement of initiating a new logon session, retrieving a roaming profile and individually entering authentication passwords for a server-hosted domain and server hosted applications. At the same time, the second doctor would not have access to the first doctor's remote session. In one implementation, in the event a different interactive user logs on to the electronic device, the first doctor's suspended remote session is saved for a period of time and may be restored to a different electronic device in the hospital following the authentication procedures outlined above. In another implementation, the remote session of an interactive user is only saved for a pre-determined period of time before being closed even if the interactive user logs back on to the same electronic device he was previously using.

In one aspect of the present invention, the interactive user accessing the client device has a previously saved remote session restored that had been initiated by the interactive user on a different device. In another aspect of the present invention, the interactive user is prompted for additional authorization prior to local applications on the electronic device being launched. In an additional aspect of the present invention, session start scripts automatically launch and authenticate applications.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention. Similarly, data structures other than the ones mentioned herein may be used to hold data without departing from the scope of the present invention.

We claim:

1. A system for providing permission-based access to an existing logon session, comprising:
    a storage location holding a plurality of sets of interactive user credentials, each set of credentials associated with a different interactive user and indicating at least one permission level for at least one application and an access level for a server-hosted domain;
    the client executing an active operating system logon session for a shared account, the active operating system logon session established with a default user profile not associated with a particular interactive user;
    an additional authentication application executing on the client to authenticate a first local interactive user independently from the active operating logon session;
    a server in connection with the client, the server initiating a server-hosted session for the first local interactive user of the client responsive to the authentication of the first local interactive user by the additional authentication application, the first local interactive user accessing the client via the default user profile; and
    a credential delivery application communicating with the server and the client, the credential delivery application receiving, from the client, an identifier identifying the first local interactive user and using the identifier to retrieve a first set of credentials for the first local interactive user from the storage location,
    the first set of credentials delivered by the credential delivery application to the server, the first set of credentials used to map the first local interactive user to the server-hosted session for the first local interactive user.

2. The system of claim 1 wherein the server is remotely located from the client.

3. The system of claim 1, comprising further: a smart card reader located at the client for receiving the identifier from the first local interactive user via a smart card.

4. The system of claim 1, comprising further: an input device communicating with the client and used to receive the identifier via one of a retinal scan, a fingerprint analysis, a software-based facial recognition process and a proximity sensing process.

5. A method for providing permission-based access to an active operating system logon session, the method comprising:
    hosting an active operating system logon session on an electronic device in communication with a server, the active operating system logon session executed by a client for a shared account established with a default user profile not associated with a particular interactive user;
    executing, by the client, an additional authentication application to authenticate a first local interactive user independently from the active logon session;
    receiving, by a credential delivery application executing on the server and from the electronic device, a first identifier identifying the first local interactive user of the client, the first local interactive user accessing the client via the default user profile;
    using the first identifier to retrieve, from a storage location accessible to the electronic device and the server, a first set of credentials for the first local interactive user, the first set of credentials indicating at least one permission level for at least one application and an access level for a server-hosted session associated with the first local interactive user;
    initiating, by the server, the server-hosted session responsive to authentication of the first local interactive user by the additional authentication application;
    delivering, by the credential delivery application, the first set of credentials to the server-hosted session; and
    mapping the first local interactive user to the server-hosted session using the first set of credentials.

6. The method of claim 5 wherein initiating the server-hosted session further comprises initiating the server-hosted session responsive to receiving the first set of credentials for the first local interactive user.

7. The method of claim 5 wherein the server-hosted session that the first local interactive user is mapped into is a previously-saved session associated with the first local interactive user.

8. The method of claim 5, further comprising:
locking the active operating system logon session on the electronic device;
receiving a second identifier identifying a second local interactive user via the electronic device; and
unmapping the first local interactive user from the server-hosted session for the first local interactive user upon receiving the second identifier, the first local interactive user being unmapped while the operating system logon session is still active.

9. The method of claim 8, further comprising:
using the second identifier to retrieve, from a storage location, a second set of credentials for the second local interactive user, the second set of credentials indicating at least one permission level for at least one of at least one application and an access level for a server-hosted session for the second local interactive user;
mapping the second local interactive user into the server-hosted session for the second interactive user using the second set of credentials; and
unlocking the active operating session on the electronic device subsequent to mapping the second local interactive user into the server-hosted session.

10. The method of claim 8 wherein the active operating system logon session is locked following a receipt of an indication from the first local interactive user.

11. The method of claim 8 wherein the active operating system logon session is locked following the expiration of a time parameter.

12. The method of claim 8 wherein the active operating system logon session is locked upon receiving notice from a proximity sensor that the first local interactive user has moved a pre-determined distance from the electronic device.

13. The method of claim 5 wherein the first identifier is transmitted from a smart card.

14. The method of claim 13 wherein the first identifier is received by the smart card in encrypted form and at least partially decrypted by the smart card.

15. The method of claim 5, wherein the first identifier is encrypted and further comprising:
storing the plurality of sets of interactive user credentials in encrypted form;
decrypting the first identifier;
retrieving an encrypted set of credentials from the storage location; and
using the decrypted first identifier to decrypt the encrypted set of credentials retrieved from the storage location.

16. The method of claim 5 wherein the first identifier is received using one of a retinal scan, a fingerprint analysis, a software-based facial recognition system and a proximity sensor.

17. The method of claim 5 wherein the first set of credentials includes different permission levels for different applications.

18. The method of claim 5, wherein following the mapping of the first local interactive user into the server-hosted session associated with the first local interactive user, the method further comprises: receiving additional identifiers from the first local interactive user prior to allowing the first local interactive user to run a local application hosted by the electronic device.

19. The method of claim 5 wherein the access level for the server-hosted session is one of read and read-write.

20. The method of claim 5 wherein the server and electronic device communicate over a network.

21. The method of claim 5, wherein the active operating system logon session is an existing operating system logon session.

22. The method of claim 21 wherein the first set of credentials includes different permission levels for different applications.

23. A computer-readable program having instructions executable by a processor to provide permission-based access to an existing session, the computer readable medium comprising:
instructions for hosting an active operating system logon session on an electronic device in communication with a server, the active operating system logon session executed by a client for a shared account established with a default user profile not associated with a particular interactive user;
instructions for executing, by the client, an additional authentication application to authenticate a first local interactive user independently from the active logon session;
instructions for receiving, by a credential delivery application executing on the server and from the electronic device, a first identifier identifying the first local interactive user of the client, the first local interactive user accessing the client via the default user profile;
instructions for using the first identifier to retrieve, from a storage location accessible to the electronic device and the server, a first set of credentials for the first local interactive user, the first set of credentials indicating at least one permission level for at least one application and an access level for a server-hosted session associated with the first local interactive user;
instructions for initiating, by the server, the server-hosted session responsive to authentication of the first local interactive user by the additional authentication application;
instructions for delivering, by the credential delivery application, the first set of credentials to the server-hosted session; and
instructions for mapping the first local interactive user to the server-hosted session for the first local interactive user using the first set of credentials.

24. The computer readable medium of claim 23, further comprising:
instructions for locking the active operating system logon session on the electronic device;
instructions for receiving a second identifier identifying a second local interactive user via the electronic device; and
instructions for unmapping the first local interactive user from the server-hosted session for the first local interactive user upon receiving the second identifier, the first local interactive user being unmapped while the operating system logon session is still active.

25. The computer readable medium of claim 24, further comprising:
instructions for using the second identifier to retrieve, from a storage location, a second set of credentials for the second local interactive user, the second set of credentials indicating at least one permission level for at least one of at least one application and an access level for a server-hosted session for the second local interactive user;

instructions for mapping the second local interactive user into the server-hosted session using the second set of credentials; and instructions for unlocking the active operating session on the electronic device subsequent to the mapping of the second local interactive user into the server-hosted session for the second interactive user.

26. The computer readable medium of claim 23 wherein the first set of credentials includes different permission levels for different applications.

27. The computer readable medium of claim 23, further comprising:

instructions for receiving an identifier via one of a retinal scan, a fingerprint analysis, a software-based facial recognition process and a proximity sensor.

28. The computer readable medium of claim 23, further comprising:

instructions for receiving at a smart card in communication with the electronic device, the first identifier in encrypted form.

29. The computer readable medium of claim 28 wherein the smart card at least partially decrypts the identifier.

30. The computer readable medium of claim 29 wherein a decrypted identifier is used to decrypt an encrypted set of interactive user credentials.

31. The computer readable medium of claim 23, wherein the first identifier is encrypted and further comprising:

instructions for storing the plurality of sets of interactive user credentials in encrypted form;

instructions for decrypting the first identifier;

instructions for retrieving an encrypted set of credentials from the storage location; and instructions for using the decrypted first identifier to decrypt the encrypted set of credentials retrieved from the storage location.

* * * * *